US008832121B2

(12) United States Patent
Smith et al.

(10) Patent No.: US 8,832,121 B2
(45) Date of Patent: Sep. 9, 2014

(54) LOCATION-BASED DATA COMMUNICATIONS SYSTEM AND METHOD

(75) Inventors: Steven Smith, State College, PA (US); Michael Alan Steinberg, State College, PA (US); Christopher Patti, State College, PA (US); Douglas Yule, State College, PA (US)

(73) Assignee: AccuWeather, Inc., State College, PA (US)

( * ) Notice: Subject to any disclaimer, the term of this patent is extended or adjusted under 35 U.S.C. 154(b) by 260 days.

(21) Appl. No.: 11/344,043

(22) Filed: Feb. 1, 2006

(65) Prior Publication Data

US 2006/0178140 A1 Aug. 10, 2006

Related U.S. Application Data

(60) Provisional application No. 60/648,700, filed on Feb. 2, 2005.

(51) Int. Cl.
*G06F 17/30* (2006.01)

(52) U.S. Cl.
USPC ........... 707/751; 707/708; 707/748; 707/754; 707/755; 707/756

(58) Field of Classification Search
CPC ................................. G06F 17/30; G06F 17/00
See application file for complete search history.

(56) References Cited

U.S. PATENT DOCUMENTS

| 4,015,366 | A |   | 4/1977 | Hall, III |         |
|-----------|---|---|--------|-----------|---------|
| 4,438,439 | A | * | 3/1984 | Shreve ......................... | 342/449 |
| 4,459,682 | A | * | 7/1984 | Mossberg ..................... | 365/119 |
| 4,473,844 | A | * | 9/1984 | Klein ............................ | 348/251 |
| 4,521,857 | A |   | 6/1985 | Reynolds, III |     |
| 4,529,982 | A | * | 7/1985 | Karlstrom et al. ............ | 340/991 |

(Continued)

FOREIGN PATENT DOCUMENTS

| AU | 2001277030 B2 | 3/2006 |
| AU | 2006204945 A1 | 7/2006 |

(Continued)

OTHER PUBLICATIONS

Ohbuchi, R., et al., "Shape-similarity search of three-dimensional models using parameterized statistics," Oct. 9-11, 2002, In the Proceedings of the 10th Pacific Conference on Computer Graphics and Applications, pp. 265-274.*

(Continued)

*Primary Examiner* — Farhan Syed
(74) *Attorney, Agent, or Firm* — Blank Rome LLP

(57) ABSTRACT

A communications system and method for communicating geographic location-based information to a client computer operating in a communications network is disclosed. The system involves the use of a geographic location-based records database, a client profile database containing at least one user preference, a means for receiving at least one request from a client computer, the request including information about a location of the client computer, and a means for parsing the request to identify the location of the client computer. The system and method involve identifying a set of information records from the database that are relevant to the location of the client computer and the user's preferences, an algorithm that computes a statistical result from the information records, and a communications network for communicating the result to the client computer.

23 Claims, 3 Drawing Sheets

(56) References Cited

U.S. PATENT DOCUMENTS

| | | | |
|---|---|---|---|
| 4,577,109 A * | 3/1986 | Hirschfeld | 250/461.1 |
| 4,586,827 A * | 5/1986 | Hirsch et al. | 368/282 |
| 4,755,942 A | 7/1988 | Gardner et al. | |
| 4,774,658 A | 9/1988 | Lewin | |
| 4,892,335 A * | 1/1990 | Taft | 283/75 |
| 4,901,300 A * | 2/1990 | Van Der Zande et al. | 369/47.4 |
| 4,945,355 A | 7/1990 | Blanchette | |
| 4,972,319 A | 11/1990 | Delorme | |
| 5,111,111 A | 5/1992 | Stevens et al. | |
| 5,111,391 A | 5/1992 | Fields et al. | |
| 5,117,353 A * | 5/1992 | Stipanovich et al. | 705/7.14 |
| 5,122,959 A | 6/1992 | Nathanson et al. | |
| 5,131,020 A | 7/1992 | Liebesny et al. | |
| 5,250,955 A * | 10/1993 | Major et al. | 342/457 |
| 5,298,760 A * | 3/1994 | Fuchs et al. | 250/492.3 |
| 5,365,290 A * | 11/1994 | Suzuki et al. | 396/26 |
| 5,398,021 A | 3/1995 | Moore | |
| 5,416,694 A * | 5/1995 | Parrish et al. | 705/7.14 |
| 5,434,565 A | 7/1995 | Simon et al. | |
| 5,442,147 A * | 8/1995 | Burns et al. | 178/18.09 |
| 5,444,444 A | 8/1995 | Ross | |
| 5,448,696 A | 9/1995 | Shimada et al. | |
| 5,467,268 A | 11/1995 | Sisley et al. | |
| 5,481,254 A | 1/1996 | Gaskill et al. | |
| 5,486,830 A * | 1/1996 | Axline et al. | 342/43 |
| 5,493,709 A * | 2/1996 | Duckeck et al. | 455/185.1 |
| 5,528,678 A * | 6/1996 | Kaplan | 379/265.11 |
| 5,544,140 A * | 8/1996 | Seagrave et al. | 369/59.21 |
| 5,550,981 A * | 8/1996 | Bauer et al. | 709/220 |
| 5,555,446 A | 9/1996 | Jasinski | |
| 5,606,699 A * | 2/1997 | De Pauw et al. | 719/315 |
| 5,607,187 A * | 3/1997 | Salive et al. | 283/67 |
| 5,615,121 A | 3/1997 | Babayev et al. | |
| 5,615,223 A * | 3/1997 | Carr | 714/818 |
| 5,615,400 A * | 3/1997 | Cowsar et al. | 719/332 |
| 5,628,050 A | 5/1997 | McGraw et al. | |
| 5,642,303 A | 6/1997 | Small et al. | |
| 5,649,182 A * | 7/1997 | Reitz | 1/1 |
| 5,671,412 A * | 9/1997 | Christiano | 1/1 |
| 5,684,476 A * | 11/1997 | Anderson | 340/988 |
| 5,689,650 A * | 11/1997 | McClelland et al. | 705/36 R |
| 5,706,505 A * | 1/1998 | Fraley et al. | 1/1 |
| 5,717,589 A | 2/1998 | Thompson et al. | |
| 5,725,253 A * | 3/1998 | Salive et al. | 283/67 |
| 5,754,782 A | 5/1998 | Masada | |
| 5,757,322 A | 5/1998 | Ray et al. | |
| 5,764,906 A * | 6/1998 | Edelstein et al. | 709/219 |
| 5,768,577 A * | 6/1998 | Kleewein et al. | 1/1 |
| 5,790,664 A * | 8/1998 | Coley et al. | 709/203 |
| 5,790,953 A | 8/1998 | Wang et al. | |
| 5,794,234 A * | 8/1998 | Church et al. | 1/1 |
| 5,819,227 A | 10/1998 | Obuchi | |
| 5,828,843 A * | 10/1998 | Grimm et al. | 709/228 |
| 5,839,088 A | 11/1998 | Hancock | |
| 5,845,276 A * | 12/1998 | Emerson et al. | 1/1 |
| 5,848,131 A * | 12/1998 | Shaffer et al. | 379/88.2 |
| 5,848,378 A | 12/1998 | Shelton et al. | |
| 5,864,860 A * | 1/1999 | Holmes | 1/1 |
| 5,864,875 A * | 1/1999 | Van Huben et al. | 1/1 |
| 5,867,109 A | 2/1999 | Wiedeman | |
| 5,867,110 A | 2/1999 | Naito et al. | |
| 5,867,821 A * | 2/1999 | Ballantyne et al. | 705/2 |
| 5,880,958 A | 3/1999 | Helms et al. | |
| 5,884,267 A * | 3/1999 | Goldenthal et al. | 704/270.1 |
| 5,884,309 A * | 3/1999 | Vanechanos, Jr. | 1/1 |
| 5,892,917 A * | 4/1999 | Myerson | 709/224 |
| 5,893,905 A * | 4/1999 | Main et al. | 705/7.38 |
| 5,948,041 A | 9/1999 | Abo et al. | |
| 5,950,161 A * | 9/1999 | Kozuma et al. | 704/260 |
| 5,963,130 A | 10/1999 | Schlager et al. | |
| 5,974,447 A | 10/1999 | Cannon et al. | |
| 5,999,126 A | 12/1999 | Ito | |
| 5,999,882 A | 12/1999 | Simpson et al. | |
| 6,014,090 A | 1/2000 | Rosen et al. | |
| 6,018,699 A | 1/2000 | Baron, Sr. et al. | |
| 6,023,223 A | 2/2000 | Baxter, Jr. | |
| 6,023,765 A | 2/2000 | Kuhn | |
| 6,028,514 A | 2/2000 | Lemelson et al. | |
| 6,031,455 A | 2/2000 | Grube et al. | |
| 6,040,781 A | 3/2000 | Murray | |
| 6,043,756 A | 3/2000 | Bateman et al. | |
| 6,047,236 A | 4/2000 | Hancock et al. | |
| 6,047,327 A | 4/2000 | Tso et al. | |
| 6,049,776 A | 4/2000 | Donnelly et al. | |
| 6,070,143 A | 5/2000 | Barney et al. | |
| 6,084,510 A | 7/2000 | Lemelson et al. | |
| 6,088,679 A | 7/2000 | Barkley | |
| 6,091,959 A * | 7/2000 | Souissi et al. | 340/7.46 |
| 6,094,509 A * | 7/2000 | Zheng et al. | 382/218 |
| 6,098,048 A * | 8/2000 | Dashefsky et al. | 705/7.32 |
| 6,100,806 A | 8/2000 | Gaukel | |
| 6,108,699 A | 8/2000 | Moiin | |
| 6,112,074 A | 8/2000 | Pinder | |
| 6,133,912 A | 10/2000 | Montero | |
| 6,138,073 A * | 10/2000 | Uchigaki | 701/410 |
| 6,148,261 A | 11/2000 | Obradovich et al. | |
| 6,161,092 A | 12/2000 | Latshaw et al. | |
| 6,167,255 A | 12/2000 | Kennedy, III et al. | |
| 6,175,803 B1 * | 1/2001 | Chowanic et al. | 701/533 |
| 6,185,427 B1 | 2/2001 | Krasner et al. | |
| 6,199,045 B1 | 3/2001 | Giniger et al. | |
| 6,202,023 B1 * | 3/2001 | Hancock et al. | 701/201 |
| 6,209,026 B1 | 3/2001 | Ran et al. | |
| 6,212,393 B1 | 4/2001 | Suarez et al. | |
| 6,219,667 B1 | 4/2001 | Lu et al. | |
| 6,223,122 B1 | 4/2001 | Hancock et al. | |
| 6,233,122 B1 | 5/2001 | Summers | |
| 6,240,369 B1 | 5/2001 | Foust | |
| 6,252,544 B1 | 6/2001 | Hoffberg | |
| 6,266,612 B1 | 7/2001 | Dussell et al. | |
| 6,269,309 B1 | 7/2001 | Buckingham | |
| 6,275,774 B1 | 8/2001 | Baron, Sr. et al. | |
| 6,295,502 B1 | 9/2001 | Hancock et al. | |
| 6,297,766 B1 | 10/2001 | Koeller | |
| 6,329,904 B1 | 12/2001 | Lamb | |
| 6,334,133 B1 | 12/2001 | Thompson et al. | |
| 6,339,744 B1 | 1/2002 | Hancock et al. | |
| 6,339,747 B1 | 1/2002 | Daly et al. | |
| 6,347,216 B1 | 2/2002 | Marko et al. | |
| 6,351,218 B1 | 2/2002 | Smith | |
| 6,356,834 B2 | 3/2002 | Hancock et al. | |
| 6,360,172 B1 | 3/2002 | Burfeind et al. | |
| 6,363,411 B1 | 3/2002 | Dugan et al. | |
| 6,381,535 B1 | 4/2002 | Durocher et al. | |
| 6,405,134 B1 | 6/2002 | Smith et al. | |
| 6,408,337 B1 | 6/2002 | Dietz et al. | |
| 6,411,687 B1 | 6/2002 | Bohacek et al. | |
| 6,411,809 B1 | 6/2002 | Haakana et al. | |
| 6,418,371 B1 | 7/2002 | Arnold | |
| 6,430,562 B1 | 8/2002 | Kardos et al. | |
| 6,446,004 B1 | 9/2002 | Cao et al. | |
| 6,456,852 B2 | 9/2002 | Bar et al. | |
| 6,473,692 B2 | 10/2002 | Hancock et al. | |
| 6,484,033 B2 | 11/2002 | Murray | |
| 6,490,525 B2 | 12/2002 | Baron, Sr. et al. | |
| 6,496,776 B1 | 12/2002 | Blumberg et al. | |
| 6,498,987 B1 | 12/2002 | Kelly et al. | |
| 6,501,392 B2 | 12/2002 | Gremmert et al. | |
| 6,505,123 B1 | 1/2003 | Root et al. | |
| 6,522,875 B1 | 2/2003 | Dowling et al. | |
| 6,522,888 B1 | 2/2003 | Garceran et al. | |
| 6,526,268 B1 * | 2/2003 | Marrah et al. | 455/186.1 |
| 6,531,218 B2 | 3/2003 | Hoyt et al. | |
| 6,542,825 B2 | 4/2003 | Jones et al. | |
| 6,553,317 B1 * | 4/2003 | Lincoln et al. | 702/20 |
| 6,560,456 B1 | 5/2003 | Lohtia et al. | |
| 6,564,143 B1 | 5/2003 | Alewine et al. | |
| 6,571,279 B1 | 5/2003 | Herz et al. | |
| 6,578,005 B1 | 6/2003 | Lesaint et al. | |
| 6,587,813 B1 | 7/2003 | Whitt et al. | |
| 6,587,831 B1 | 7/2003 | O'Brien | |
| 6,587,851 B1 | 7/2003 | Ditcharo et al. | |
| 6,590,529 B2 * | 7/2003 | Schwoegler | 342/357.52 |
| 6,597,983 B2 | 7/2003 | Hancock | |

(56) References Cited

U.S. PATENT DOCUMENTS

| | | |
|---|---|---|
| 6,603,405 B2 | 8/2003 | Smith |
| 6,609,062 B2 | 8/2003 | Hancock |
| 6,611,687 B1 | 8/2003 | Clark et al. |
| 6,633,900 B1 | 10/2003 | Khalessi et al. |
| 6,646,559 B2 | 11/2003 | Smith |
| 6,647,257 B2 | 11/2003 | Owensby |
| 6,650,902 B1 | 11/2003 | Richton |
| 6,654,689 B1 | 11/2003 | Kelly et al. |
| 6,675,151 B1 | 1/2004 | Thompson et al. |
| 6,677,894 B2 | 1/2004 | Sheynblat et al. |
| 6,680,675 B1 | 1/2004 | Suzuki |
| 6,684,136 B2 | 1/2004 | Sinex |
| 6,697,859 B1 | 2/2004 | Takahashi |
| 6,731,940 B1 | 5/2004 | Nagendran |
| 6,742,002 B2 | 5/2004 | Arrowood |
| 6,745,021 B1 | 6/2004 | Stevens |
| 6,751,553 B2 * | 6/2004 | Young et al. ............... 702/5 |
| 6,753,784 B1 | 6/2004 | Sznaider et al. |
| 6,754,585 B2 | 6/2004 | Root et al. |
| 6,792,615 B1 | 9/2004 | Rowe et al. |
| 6,798,358 B2 | 9/2004 | Joyce et al. |
| 6,812,855 B1 | 11/2004 | Sudou et al. |
| 6,823,263 B1 | 11/2004 | Kelly et al. |
| 6,823,315 B1 | 11/2004 | Bucci et al. |
| 6,826,481 B2 | 11/2004 | Root et al. |
| 6,829,233 B1 | 12/2004 | Gilboy |
| 6,829,334 B1 | 12/2004 | Zirngibl et al. |
| 6,836,730 B2 | 12/2004 | Root et al. |
| 6,838,998 B1 | 1/2005 | Brown et al. |
| 6,845,324 B2 | 1/2005 | Smith |
| 6,850,895 B2 | 2/2005 | Brodersen et al. |
| 6,853,915 B2 | 2/2005 | Hubschneider et al. |
| 6,909,361 B2 | 6/2005 | McCarthy et al. |
| 6,909,903 B2 | 6/2005 | Wang |
| 6,912,545 B1 | 6/2005 | Lundy et al. |
| 6,941,126 B1 | 9/2005 | Jordan, Jr. |
| 6,944,447 B2 | 9/2005 | Portman et al. |
| 6,962,531 B2 | 11/2005 | Pace et al. |
| 6,973,384 B2 | 12/2005 | Zhao et al. |
| 6,975,942 B2 * | 12/2005 | Young et al. ............... 702/5 |
| 6,980,909 B2 | 12/2005 | Root et al. |
| 6,985,813 B2 | 1/2006 | Root et al. |
| 6,985,929 B1 | 1/2006 | Wilson et al. |
| 6,988,037 B2 | 1/2006 | Root et al. |
| 6,989,765 B2 | 1/2006 | Gueziec |
| 6,990,458 B2 | 1/2006 | Harrison et al. |
| 7,010,501 B1 | 3/2006 | Roslak et al. |
| 7,016,689 B2 | 3/2006 | Clark et al. |
| 7,024,205 B1 | 4/2006 | Hose |
| 7,024,310 B2 | 4/2006 | Root et al. |
| 7,031,724 B2 | 4/2006 | Ross et al. |
| 7,047,114 B1 | 5/2006 | Rogers |
| 7,058,510 B2 | 6/2006 | Kelly et al. |
| 7,072,666 B2 | 7/2006 | Kullman et al. |
| 7,079,631 B1 | 7/2006 | Kaufman |
| 7,084,775 B1 * | 8/2006 | Smith ............... 340/601 |
| 7,089,116 B2 | 8/2006 | Smith |
| 7,096,276 B2 * | 8/2006 | Bodin et al. ............... 709/238 |
| 7,103,596 B2 | 9/2006 | Abe et al. |
| 7,123,926 B2 | 10/2006 | Himmelstein |
| 7,139,664 B2 | 11/2006 | Kelly et al. |
| 7,171,372 B2 | 1/2007 | Daniel et al. |
| 7,181,345 B2 | 2/2007 | Rosenfeld et al. |
| 7,184,540 B2 | 2/2007 | Dezonno et al. |
| 7,184,896 B1 | 2/2007 | Benson |
| 7,191,064 B1 | 3/2007 | Myers et al. |
| 7,191,065 B2 | 3/2007 | Root et al. |
| 7,197,308 B2 | 3/2007 | Singhal et al. |
| 7,212,811 B2 | 5/2007 | Dowling et |
| 7,212,829 B1 | 5/2007 | Lau et al. |
| 7,218,938 B1 | 5/2007 | Lau et al. |
| 7,231,657 B2 | 6/2007 | Honarvar et al. |
| 7,233,781 B2 | 6/2007 | Hunter et al. |
| 7,248,159 B2 | 7/2007 | Smith |
| 7,254,481 B2 | 8/2007 | Yamada et al. |
| 7,254,588 B2 | 8/2007 | Sung et al. |
| 7,269,505 B2 | 9/2007 | Zhao et al. |
| 7,284,000 B2 | 10/2007 | Kuehr-McLaren et al. |
| 7,284,033 B2 | 10/2007 | Jhanji |
| 7,289,908 B2 | 10/2007 | Root et al. |
| 7,299,492 B2 | 11/2007 | Thrash et al. |
| 7,315,782 B2 | 1/2008 | Root et al. |
| 7,327,271 B2 | 2/2008 | Greenstein et al. |
| 7,366,522 B2 | 4/2008 | Thomas |
| 7,400,976 B2 * | 7/2008 | Young et al. ............... 702/5 |
| 7,403,925 B2 | 7/2008 | Schlesinger et al. |
| 7,406,382 B2 | 7/2008 | Brulle-Drews |
| 7,411,493 B2 | 8/2008 | Smith |
| 7,502,748 B1 | 3/2009 | Baldwin et al. |
| 7,557,730 B2 | 7/2009 | Gueziec |
| 7,567,575 B2 | 7/2009 | Chen et al. |
| 7,568,217 B1 | 7/2009 | Prasad et al. |
| 7,599,795 B1 | 10/2009 | Blumberg et al. |
| 7,602,285 B2 | 10/2009 | Sznaider et al. |
| 7,606,663 B2 | 10/2009 | Neef et al. |
| 7,647,022 B2 | 1/2010 | Ng et al. |
| 7,650,633 B2 | 1/2010 | Whitson |
| 7,668,832 B2 | 2/2010 | Yeh et al. |
| 7,720,606 B2 | 5/2010 | Burfeind et al. |
| 7,917,555 B2 | 3/2011 | Gottumukkala et al. |
| 8,229,467 B2 | 7/2012 | Root et al. |
| 2001/0029160 A1 | 10/2001 | Aznal |
| 2001/0030624 A1 | 10/2001 | Schwoegler |
| 2001/0042001 A1 | 11/2001 | Goto et al. |
| 2001/0049584 A1 | 12/2001 | Jones et al. |
| 2001/0051888 A1 | 12/2001 | Mayhak et al. |
| 2001/0053999 A1 | 12/2001 | Feinberg |
| 2002/0000930 A1 | 1/2002 | Crowson et al. |
| 2002/0009353 A1 | 1/2002 | Kelsey et al. |
| 2002/0010615 A1 | 1/2002 | Jacobs |
| 2002/0025964 A1 | 2/2002 | Streuff et al. |
| 2002/0029160 A1 | 3/2002 | Thompson et al. |
| 2002/0040313 A1 | 4/2002 | Hunter et al. |
| 2002/0049310 A1 | 4/2002 | Tateishi et al. |
| 2002/0052674 A1 | 5/2002 | Chang et al. |
| 2002/0062451 A1 | 5/2002 | Scheidt et al. |
| 2002/0069020 A1 | 6/2002 | Burfeind et al. |
| 2002/0077876 A1 * | 6/2002 | O'Meara et al. ............... 705/8 |
| 2002/0091568 A1 | 7/2002 | Kraft et al. |
| 2002/0095333 A1 | 7/2002 | Jokinen et al. |
| 2002/0160745 A1 | 10/2002 | Wang |
| 2002/0165732 A1 | 11/2002 | Ezzeddine et al. |
| 2002/0173981 A1 | 11/2002 | Stewart |
| 2002/0183117 A1 | 12/2002 | Takahashi et al. |
| 2002/0194366 A1 * | 12/2002 | Bodin et al. ............... 709/238 |
| 2003/0004780 A1 | 1/2003 | Smith et al. |
| 2003/0004802 A1 | 1/2003 | Callegari |
| 2003/0014297 A1 | 1/2003 | Kaufman et al. |
| 2003/0028410 A1 | 2/2003 | House et al. |
| 2003/0059158 A1 | 3/2003 | Lacey |
| 2003/0060211 A1 | 3/2003 | Chern et al. |
| 2003/0068974 A1 | 4/2003 | Kanamaluru et al. |
| 2003/0100315 A1 | 5/2003 | Rankin |
| 2003/0113014 A1 * | 6/2003 | Katoh ............... 382/167 |
| 2003/0125963 A1 | 7/2003 | Haken |
| 2003/0132298 A1 | 7/2003 | Swartz et al. |
| 2003/0149607 A1 | 8/2003 | Ogasawara et al. |
| 2003/0171870 A1 | 9/2003 | Gueziec |
| 2003/0191765 A1 | 10/2003 | Bargh et al. |
| 2003/0191795 A1 | 10/2003 | Bernardin et al. |
| 2003/0198337 A1 | 10/2003 | Lenard |
| 2004/0010372 A1 | 1/2004 | Schwoegler |
| 2004/0010591 A1 | 1/2004 | Sinn et al. |
| 2004/0023666 A1 | 2/2004 | Moon et al. |
| 2004/0059996 A1 | 3/2004 | Fasciano |
| 2004/0093265 A1 | 5/2004 | Ramchandani et al. |
| 2004/0107126 A1 | 6/2004 | Kataoka et al. |
| 2004/0110515 A1 | 6/2004 | Blumberg et al. |
| 2004/0161097 A1 | 8/2004 | Henry |
| 2004/0167813 A1 | 8/2004 | Robertson et al. |
| 2004/0172343 A1 | 9/2004 | Allibhoy et al. |
| 2004/0199655 A1 | 10/2004 | Davies et al. |
| 2004/0221308 A1 | 11/2004 | Cuttner et al. |
| 2004/0267595 A1 | 12/2004 | Woodings et al. |

(56) References Cited

U.S. PATENT DOCUMENTS

| | | |
|---|---|---|
| 2005/0021666 A1 | 1/2005 | Dinnage et al. |
| 2005/0021806 A1 | 1/2005 | Richardson et al. |
| 2005/0021980 A1 | 1/2005 | Kanai |
| 2005/0027449 A1 | 2/2005 | Marsh |
| 2005/0040847 A1 | 2/2005 | Unger et al. |
| 2005/0050008 A1 | 3/2005 | Root et al. |
| 2005/0055374 A1 | 3/2005 | Sato |
| 2005/0096962 A1 | 5/2005 | Narasimhan et al. |
| 2005/0136917 A1 | 6/2005 | Taylor |
| 2005/0136983 A1 | 6/2005 | Agapi et al. |
| 2005/0174235 A1 | 8/2005 | Davis et al. |
| 2005/0181803 A1 | 8/2005 | Weaver et al. |
| 2005/0192724 A1 | 9/2005 | Hendry |
| 2005/0227709 A1 | 10/2005 | Chang et al. |
| 2005/0228873 A1 | 10/2005 | Tapuska et al. |
| 2005/0240378 A1 | 10/2005 | Smith et al. |
| 2005/0245243 A1 | 11/2005 | Zuniga |
| 2005/0251370 A1* | 11/2005 | Li et al. .................... 702/190 |
| 2006/0022846 A1 | 2/2006 | Tummala |
| 2006/0028400 A1 | 2/2006 | Lapstun et al. |
| 2006/0046740 A1 | 3/2006 | Johnson |
| 2006/0111089 A1 | 5/2006 | Winter et al. |
| 2006/0123053 A1 | 6/2006 | Scannell |
| 2006/0142024 A1 | 6/2006 | Thalanany et al. |
| 2006/0161469 A1 | 7/2006 | Root et al. |
| 2006/0164259 A1 | 7/2006 | Winkler et al. |
| 2006/0178140 A1 | 8/2006 | Smith et al. |
| 2006/0194595 A1 | 8/2006 | Myllynen et al. |
| 2006/0265228 A1 | 11/2006 | Ando |
| 2006/0271560 A1 | 11/2006 | Mitchell |
| 2006/0293065 A1 | 12/2006 | Chew et al. |
| 2006/0294147 A1 | 12/2006 | Root et al. |
| 2007/0005363 A1 | 1/2007 | Cucerzan et al. |
| 2007/0021906 A1 | 1/2007 | Yeh et al. |
| 2007/0094071 A1 | 4/2007 | Seraji et al. |
| 2007/0112511 A1 | 5/2007 | Burfeind et al. |
| 2007/0127423 A1 | 6/2007 | Ho |
| 2007/0162320 A1 | 7/2007 | Joshi et al. |
| 2007/0162328 A1 | 7/2007 | Reich |
| 2007/0168131 A1 | 7/2007 | Root et al. |
| 2007/0168524 A1 | 7/2007 | Chao et al. |
| 2007/0192159 A1 | 8/2007 | Root et al. |
| 2007/0260531 A1 | 11/2007 | Bezancon |
| 2007/0260708 A1 | 11/2007 | Beaton et al. |
| 2007/0260741 A1 | 11/2007 | Bezancon |
| 2007/0270165 A1 | 11/2007 | Poosala |
| 2007/0270166 A1 | 11/2007 | Hampel et al. |
| 2007/0293240 A1 | 12/2007 | Drennan |
| 2008/0021645 A1 | 1/2008 | Lau et al. |
| 2008/0070550 A1 | 3/2008 | Hose |
| 2008/0082264 A1 | 4/2008 | Hill et al. |
| 2008/0084857 A1 | 4/2008 | Gorti et al. |
| 2008/0134043 A1 | 6/2008 | Georgis et al. |
| 2008/0157990 A1 | 7/2008 | Belzer et al. |
| 2008/0160956 A1 | 7/2008 | Jackson et al. |
| 2008/0161012 A1 | 7/2008 | Haran et al. |
| 2008/0183710 A1 | 7/2008 | Serjeantson et al. |
| 2008/0207183 A1 | 8/2008 | Root et al. |
| 2008/0271120 A1 | 10/2008 | Parkes et al. |
| 2008/0275759 A1 | 11/2008 | Parkes et al. |
| 2008/0294478 A1 | 11/2008 | Joshi et al. |
| 2008/0313037 A1 | 12/2008 | Root et al. |
| 2008/0319652 A1 | 12/2008 | Moshfeghi |
| 2008/0319653 A1 | 12/2008 | Moshfeghi |
| 2009/0061903 A1 | 3/2009 | Khokhar |
| 2009/0073885 A1 | 3/2009 | Jalil et al. |
| 2009/0083150 A1 | 3/2009 | Mashinsky |
| 2009/0131080 A1 | 5/2009 | Nadler et al. |
| 2009/0156161 A1 | 6/2009 | Strahs |
| 2009/0176511 A1 | 7/2009 | Morrison |
| 2009/0176512 A1 | 7/2009 | Morrison |
| 2009/0177374 A1 | 7/2009 | Liu |
| 2009/0209233 A1 | 8/2009 | Morrison |
| 2009/0210441 A1 | 8/2009 | Mercer et al. |
| 2009/0233575 A1 | 9/2009 | Morrison |
| 2009/0233633 A1 | 9/2009 | Morrison |
| 2009/0239511 A1 | 9/2009 | Chen et al. |
| 2009/0240428 A1 | 9/2009 | Shahrestani |
| 2009/0265099 A1 | 10/2009 | Gottlieb |
| 2009/0275348 A1 | 11/2009 | Weinreich et al. |
| 2009/0305645 A1 | 12/2009 | Watanabe |
| 2010/0009657 A1 | 1/2010 | Dingler et al. |
| 2010/0013629 A1 | 1/2010 | Sznaider et al. |
| 2010/0036717 A1 | 2/2010 | Trest |
| 2010/0069052 A1 | 3/2010 | Ahomaki et al. |
| 2010/0069093 A1 | 3/2010 | Morrison |

FOREIGN PATENT DOCUMENTS

| | | |
|---|---|---|
| AU | 2007207616 A1 | 7/2007 |
| AU | 2006202473 A1 | 1/2010 |
| CA | 2418268 A1 | 1/2002 |
| CA | 2514868 A1 | 8/2004 |
| CA | 2594001 A1 | 7/2006 |
| CN | 1230265 A | 9/1999 |
| CN | 1449615 A | 10/2003 |
| CN | 1659602 A | 8/2005 |
| CN | 1745540 A | 3/2006 |
| CN | 101083784 A | 12/2007 |
| CN | 101120316 A | 2/2008 |
| EP | 0436263 A1 | 7/1991 |
| EP | 0703463 A2 | 3/1996 |
| EP | 0798539 A2 | 10/1997 |
| EP | 1143399 A1 | 10/2001 |
| EP | 1303965 A2 | 4/2003 |
| EP | 1473684 A1 | 11/2004 |
| EP | 1593085 A2 | 11/2005 |
| EP | 1856608 A2 | 11/2007 |
| EP | 1912409 A1 | 4/2008 |
| EP | 1999665 A2 | 12/2008 |
| GB | 2201865 A | 9/1988 |
| GB | 2216319 A | 10/1989 |
| JP | 1065596 A | 3/1989 |
| JP | 08221694 A | 8/1996 |
| JP | 11-136365 A | 5/1999 |
| JP | 2000167232 A | 6/2000 |
| JP | 2001126170 A | 5/2001 |
| JP | 2001175718 A | 6/2001 |
| JP | 2002019928 A | 1/2002 |
| JP | 2002056156 A | 2/2002 |
| JP | 2002140451 A | 5/2002 |
| JP | 2002251484 A | 9/2002 |
| JP | 2002255465 | 9/2002 |
| JP | 2002255465 A | 9/2002 |
| JP | 2002269335 A | 9/2002 |
| JP | 2002303527 A | 10/2002 |
| JP | 2003099350 A | 4/2003 |
| JP | 2003186900 A | 7/2003 |
| JP | 2003196284 A | 7/2003 |
| JP | 200245339 A | 9/2003 |
| JP | 2003272078 A | 9/2003 |
| JP | 2003280561 A | 10/2003 |
| JP | 2003281694 A | 10/2003 |
| JP | 2003323528 A | 11/2003 |
| JP | 2003337874 A | 11/2003 |
| JP | 2004505501 A | 2/2004 |
| JP | 2004110496 | 4/2004 |
| JP | 2004511836 A | 4/2004 |
| JP | 2004514333 A | 5/2004 |
| JP | 2004529543 A | 9/2004 |
| JP | 2004328308 A | 11/2004 |
| JP | 2004334782 A | 11/2004 |
| JP | 2005073147 A | 3/2005 |
| JP | 2005-309489 | 11/2005 |
| JP | 2006107136 A | 4/2006 |
| JP | 2009524150 A | 6/2009 |
| JP | 2012083743 A | 4/2012 |
| KR | 20010100635 A | 11/2001 |
| KR | 20020090910 A | 12/2002 |
| KR | 20030075238 A | 9/2003 |
| KR | 20050080370 A | 8/2005 |
| WO | 9607110 A1 | 3/1996 |
| WO | 9741654 A1 | 11/1997 |
| WO | 9802824 A1 | 1/1998 |

(56) References Cited

FOREIGN PATENT DOCUMENTS

| | | | |
|---|---|---|---|
| WO | 9819479 | A1 | 5/1998 |
| WO | 9923591 | A1 | 5/1999 |
| WO | 9957700 | A1 | 11/1999 |
| WO | 0004730 | A1 | 1/2000 |
| WO | 0004734 | A1 | 1/2000 |
| WO | 0004737 | A1 | 1/2000 |
| WO | 0013047 | A1 | 3/2000 |
| WO | 0041104 | | 7/2000 |
| WO | 0041104 | A2 | 7/2000 |
| WO | 0195140 | A | 12/2001 |
| WO | 0195140 | A2 | 12/2001 |
| WO | 0209353 | A2 | 1/2002 |
| WO | 0221864 | A1 | 3/2002 |
| WO | 0225964 | A2 | 3/2002 |
| WO | 0239217 | | 5/2002 |
| WO | 0239217 | A2 | 5/2002 |
| WO | 0239732 | A | 5/2002 |
| WO | 0239732 | A1 | 5/2002 |
| WO | 0249310 | A2 | 6/2002 |
| WO | 03069576 | A1 | 8/2003 |
| WO | 2004059996 | A1 | 7/2004 |
| WO | 2004070993 | A2 | 8/2004 |
| WO | 2005040847 | A2 | 5/2005 |
| WO | 2006076460 | A2 | 7/2006 |
| WO | 2007084458 | A2 | 7/2007 |

OTHER PUBLICATIONS

Lee, Jay et al., "Statistical Analysis with Arcview GIS," 2001, Wiley Books, pp. 1-203.*
Goodchild, Michael, et al., "Integrating Gis and spatial data analysis: problems and possibilities," 1992, International Journal on Geographical Information Systems, vol. 6, no. 5, pp. 407-423 (17 total pp.).*
Author Unknown, "Personal Digital Radio Service," IBM Techical Bulletin, Aug. 1995, pp. 315-316, IP.com Prior Art Database, Amherst, NY, USA.
Myers, "Personal Digital Radio Service," IBM Technical Bulletin, vol. 38, No. 8, p. 315, Aug. 1995.
Author Unknown, "The Nexterna Clearview Dispatch Module," 2005, 2 pp., Nexterna Limited, Burlington, Ontario, Canada.
Author Unknown, "Dispenser Services Inc. Selects Web-Based Field Resource Management Solution From Nexterna," PR Newswire, Aug. 14, 2002, 2 pp., ProQuest LLC, New York, NY, USA.
Author Unknown, "Nexterna Announces Newest Release of Nexterna Clearview," PR Newswire, Sep. 26, 2002, 2 pp., ProQuest LLC, New York, NY, USA.
Author Unknown, "Nexterna.com Web Pages Nexterna Inc. 2002-2003," retrieved from Archive. Org on May 20, 2009, 31 pp.
Author Unknown, "Nexterna Optitrac," Nexterna Inc. 2002-2003, retrieved from Archive.Org on May 20, 2009, pp. 32-38.
Bisio, et al., "Effective Resource Scheduling in Work Force Management Context for Telecommunication Work Centers," Centro Studi E. Laboratori Telecommunicazioni Via G. Reiss Romoli, 1999, pp. 1-5, vol. 274, Torino, Italy.
Boselly III, et al., "Road Weather Information Systems vol. 2: Implementation Guide," Strategic Highway Research Program, 1993, pp. 1-82, National Academy of Sciences, Washington, DC, USA.
Collins, et al., "Automated Assignment and Scheduling of Service Personnel," AI in Corporate Service & Support, Apr. 1994, pp. 33-39, IEEE Expert.
Author Unknown, "Computer-Assisted Dispatch," definition retrieved from Wikipedia.org on Oct. 15, 2008, 15 pp.
Author Unknown, "Dispatch (Logistics)," definition retrieved from Wikipedia.org on Oct. 15, 2008, 11 pp.
Feldman, et al., "Making Cell Phones Indispensable for Techs," Contractor, Jul. 2004, pp. 40 & 54, vol. 51, No. 7, ABI/Inform Global.
Author Unknown, "iMedeon Announces Support for Microsoft Windows CE Devices for its Wireless Web-based Mobile Workforce Management Applications," Business Wire, Feb. 5, 2001.

Jing, et al., "WHAM: Supporting Mobile Workforce and Applications in Workflow Environments RIDE 2000," Research Issues in Data Engineering, Feb. 2000, 8 pp.
Kruse, "Snow and Ice Go Hi-Tech," Mobile Radio Technology Magazine, Oct. 1, 1999, pp. 1-4.
Lesaint, et al., "Dynamic Workforce Management," AI for Network: Management Systems, Apr. 14, 1997, pp. 1-5, IEE, London, UK.
Author Unknown, "TMC Labs Reviews—Maxima Advantage," Call Center CRM Solutions, Jan. 2000, 4 pp., vol. 18, No. 7, ABI/Inform Global.
Author Unknown, "MDSI Mobile Data Solution—Innovative and Effective Mobile Workforce Management," MDSI-Advantex.com, Feb. 1999, 19 pp.
Author Unknown, "MobileAria and WeatherBank Announce Partnership to Avert Delays, Increase Driver Productivity," Business Wire, Jun. 26, 2001, pp. 1-2, ProQuest LLC, New York, NY, USA.
Author Unknown, "Real-Time Wireless Workforce Solutions—MC Field Manager," Mobile Centrex Inc., retrieved from Archive.org on Oct. 15, 2008, 7 pp.
Author Unknown, "Real-Time Wireless Workforce Solutions—With Mobile Centrex You Can . . . ," Mobile Centrex Inc., retrieved from Archive.org on Oct. 15, 2008, 5 pp.
Author Unknown, "Real-Time Wireless Workforce Solutions—Features That Work for You," Mobile Centrex Inc., retrieved from Archive.org on Oct. 15, 2008, 10 pp.
Partyka, et al., "On the Road to Service," ORMS Today, Aug. 2000, pp. 1-8, Lionheart Publishing, Inc., Marietta, GA, USA.
Rhinehart, "City Uses GIS to Monitor Snow-Fighting Fleet," The American City & County, Apr. 1999, p. 31, vol. 144, No. 4, ABI/Inform Global.
Timmins, "Mobile Workers Sync Up—PeopleSoft, Eduprise.com Team for KCVU," IT Support News, Dec. 1999, pp. 28 & 30, vol. 19, No. 13, ProQuest Computing.
Author Unknown, "Vantive and MDSI to Provide Enterprise Wide Wireless Field Service Solution," PR Newswire, Oct. 26, 1998, pp. 1-3, ProQuest LLC, New York, NY, USA.
Author Unknown, "Visual Staff Scheduler Pro Version 3.0 User Guide," 1997, pp. 1-152, Atlas Business Solutions, Inc.
Weigel, et al., "Applying GIS and OR Techniques to Solve Sears Technician-Dispatching and Home-Delivery Problems," Interfaces, Jan.-Feb. 1999, pp. 112-130, vol. 29, No. 1, Institute for Operations Research and Management Sciences.
Howard County Bureau of Highways, "Web-Enabled Snowplow Tracking System," Howard County, 1999, pp. 1-11.
Author Unknown, "Motorola iRadio(TM) System Hits the Road at Consumer Electronics Show 2001," PR Newswire, Jan. 4, 2001, pp. 1-2, ProQuest LLC, New York, NY, USA.
Le Comte, "Using Your Computer—Software Review," Weatherwise, Aug. 1991, pp. 48-51, vol. 44, No. 4.
Freedman, "Pinpoint Weather," Technology Review, Jun. 2003, pp. 52-58, vol. 106, No. 5, ABI/Inform Global.
Author Unknown, "Yahoo! and Weather.com Forge Multi-National Agreement to Provide Enhanced Weather Reports," Business Wire, Jan. 7, 2002, pp. 1-3, ProQuest LLC, New York, NY, USA.
Ohta, et al., "Real-World Community Platform: Mobile Multi-User Communication System," Multimedia Laboratories, NTT DoCoMo, Inc., 2000, pp. 601-606.
Lee, et al., "Statistical Analysis with Arcview GIS," 2001, pp. 1-192, John Wiley & Sons, Inc., New York, NY, USA.
Ohbuchi, et al., "Shape-Similarity Search of Three-Dimensional Models Using Parameterized Statistics," Oct. 9-11, 2002, in the Proceedings of the 10th Pacific Conference on Computer Graphics and Applications, pp. 265-274, IEEE.
Oh et al., "A Model for Role Administration Using Organization Structure",SACMAT '02, Jun. 3-4, 2002, pp. 155-162.
Botha, R.A. et al., "Separation of duties for access control enforcement in workflow environments", IBM Systems Journal, vol. 40, No. 3, 2001, pp. 666-682.
What is Access Management?, 2AB Inc., Jan. 2004, 6 pages.
Harris, Shon, Mike Myer's Certification Passport CISSP, McGraw-Hill, 2002, ISBN 0-07-222578-5, Chapter 2, 54 pages.

(56) References Cited

OTHER PUBLICATIONS

Park, Joon S. et al., "Role-Based Access Control on the Web", ACM Transactions on Information and System Security, vol. 4, No. 1, Feb. 2001, pp. 37-71.

McCormick, Vickie L., "Using HR Information systems for HIPAA role-vased access compliance", Journal of Health Care Compliance, vol. 5, No. 2, Mar./Apr. 2003, pp. 31-32.

Langforn, Jeff, "Implementating Least Privilege at your Enterprise", SANS Institute, Jul. 5, 2003, 21 pages.

Cuppens, Frederick et al., "Modeling Contexts in the Or-BAC Model", ACSAC'03, 2003, pp. 1-10.

Principles of Least Privilege definition, Wikipedia.org, Reprinted Jul. 11, 2012, 5 pages.

* cited by examiner

LOCATION-BASED DATA COMMUNICATIONS SYSTEM AND METHOD

CROSS-REFERENCE TO RELATED APPLICATIONS

This application claims the benefit of U.S. Provisional Application No. 60/648,700 filed Feb. 2, 2005, the entire disclosure of which is incorporated by reference herein.

BACKGROUND OF THE INVENTION

1. Field of Invention

The present invention relates to a communications system and method for delivering location-based data. In particular, the present invention relates to a system and method for electronically providing and delivering personalized data and information to a client's communications device based on the geographic location of the communications device or a client-entered geographic location.

2. Description of the Related Art

According to telecommunications industry sources, the number of world-wide users of wireless mobile devices will continue to rise to 2 billion by 2007. That increase has been the result of the popularity and relative low price point for ownership of wireless devices. Industry experts have stated that revenue from exchanges of data, such as text and images, via mobile phones will likely rise to 30 percent of global mobile revenue by 2008. Responding to that increased need, systems and methods for communicating information, and in particular personalized, location-specific information, to users of wireless devices continue to be developed.

For example, U.S. Pat. No. 6,202,023 discloses a system and method for automatically providing services over a computer network, such as the Internet, for users in a mobile environment based on their geographic location. A client computer system is equipped with a local storage device, a wireless transceiver, an input device, an output device, and an automatic location identifying device, such as a GPS telemetry receiver and associated computation circuitry. An application program is installed on the client computer system, which includes a mobile phone, that prompts the user to input information. The application program builds a data packet having location information and user information and stores the data packet on the local client storage device. The client computer system connects with a server coupled to a computer network, such as the Internet. Upon connection, the client automatically transmits the electronic data packet to the server. The primary server maintains a database that contains a list of enhanced services. The information in the data packet is used to formulate a database query. The result of the database query is an address of a particular enhanced server that matches the client's request. A specific universal resource locator (URL) that contains the address of the enhanced server is transmitted to the client. The client computer system launches a web browser automatically or in response to a user's input and connects to the enhanced server. Upon connection, relevant data customized for the client's location is automatically displayed without additional input from the user.

U.S. Pat. No. 6,590,529 and U.S. Patent Application Publication No. 2004/0010372-A1 disclose an individualized, location specific weather forecasting system in which, after the location of an electronic device is detected, weather data are generated and transmitted to the electronic device so that subscribers receive weather forecast data specific to their current location. The electronic device may be a wireless mobile electronic device such as a cellular telephone, a portable computer, or a personal data assistant. Detecting the location of the device may be done utilizing the global positioning satellite system and telemetry data or using information transmitted from the cellular telephone tower closest to the wireless mobile electronic device. Detecting the position of the device may also include using information transmitted from a plurality of cellular telephone towers proximate the wireless mobile electronic device (i.e., triangulation). Forecasting typically includes storing in a database a plurality of geographic sectors, and, for each sector, weather forecast data unique to that sector.

Similarly, U.S. Pat. No. 6,826,481 discloses a broadcast network for selectively transmitting individualized output signals to remote communicator devices. The broadcast network is comprised of a user input database, a communicator location database, an information database, an analysis unit and a communication network. The user input database contains user-defined parameters and each of the user-defined parameters includes a user profile. The user profile in each of the user-defined parameters utilizes a user identifier code and identifies a communicator device associated with a particular user. The communicator location database contains real-time data indicative of the spatial locations of the communicator devices. The information database contains real-time data for the spatial locations contained in the communicator location database. The analysis unit repeatedly compares the spatial location of each communicator device contained in the communicator location database with the real-time data and generates an individualized output signal.

U.S. Pat. No. 6,498,987 discloses a system and method for generating weather reports and the like which are precisely computed automatically for a particular individual user's geographic location and which are automatically provided directly to the individual user. A user establishes an individualized user profile in which the user defines a particular location of interest, a contact address, and optionally, a personalized activity weather condition profile, establishing a preferred weather condition profile for activities of interest. A detailed and accurate weather forecasting model is run to provide high geographical and temporal resolution forecast data. The high resolution forecast data are compared to the individual user profile and a personalized weather report for the particular location, times, and conditions of interest is provided directly and automatically to the individual, e.g., via e-mail. The high resolution forecast data is preferably generated locally for a limited region, e.g., at a television station for the station's viewing area, using initialization conditions provided from a central location. Data are related to a grid and only one model is used, versus a variety of inputs and forecaster interpretations that are generally needed to achieve truly personalized and location-specific forecasts.

U.S. Pat. No. 6,360,172 discloses a system for providing natural-phenomenological information personalized to the unique requirements of a subscriber and distributed to the subscriber. Natural-phenomenological data are gathered from a variety of sources, such as current ground observations, forecast conditions, satellite images, and radar data. Personal preferences of the subscribers are also gathered and stored, such as activities of the subscriber, geographic locations of the activities, sensitivities of the subscriber to natural-phenomenological conditions, calendar information of the subscriber, planned routes and times of travel, and modes of delivery. The personal preferences of the subscriber are used as a filter to identify the natural-phenomenological data that is particularly useful to the subscriber, and the resulting information is delivered to the subscriber. The subscriber identifies the destination device that the information is delivered to. The invention is extensible to support new sources of natural-phenomenological information and new output devices. Electronic delivery of the personalized natural-phenomenological information can be through any number of a variety of output mediums, including pagers, text to voice synthesizers to create an audio stream for playback either via a telephone or a personal digital assistant (PDA), a multimedia-enabled computer, e-mail, computer display monitors, PDA, and a PCS phone.

U.S. Pat. No. 6,603,405 discloses a system and method for receiving weather forecast information in a vehicle and using that information to warn a vehicle operator of a future weather hazard with reference to the vehicle's intended direction of travel. The method involves generating a weather forecast covering several geographic-specific cells, and indicating for each cell whether a forecast weather hazard exists for that cell; generating forecast vehicle locations with respect to the geographic-specific cells; and generating a warning for each vehicle that is forecast to be in a cell for which a weather hazard forecast exists. A communication device for receiving the warnings is disclosed as a cellular telephone or PDA associated with the vehicle.

U.S. Pat. No. 6,845,324 and related patents and applications are directed to a system and method for receiving weather forecast information in a mobile unit and using that information to warn a user of a future weather hazard with reference to the mobile unit's location and/or intended direction of travel. The system includes a hazard location algorithm that compares a forecast location of each mobile unit with a forecast hazard and transmits a warning to each mobile unit that is predicted to encounter the hazard. As the mobile unit moves, its actual position is updated in the forecasting center, and a revised warning is transmitted to the mobile unit. The hazard information may be displayed on the user's system in the form of a rotating map to display warning information in relation to the system's location. Warnings, including audio warnings for playback and crawls for display on a television, are disclosed as being automatically generated and spoken or displayed to a user.

U.S. patent application Ser. No. 10/887,854 discloses a system and method for receiving personalized weather reports based upon receiving an individual's location (e.g., lat/long) to warn users of approaching or current inclement weather conditions and to avoid the hassles and costs of unexpected weather changes. In one embodiment, a mobile phone user will be able to retrieve the current or approaching weather for his location through the mobile phone device. The wireless service provider may provide the user's location, using methods such as GPS tracking and/or triangulation, to a weather information center. The weather information center may then transmit meteorological information that it may collect or retrieve, consistent with the user's location, back to the wireless customer. Transmission of such information may be sent directly to the user's wireless device or it may go through any number of relay stations. Transmissions may travel over a range of media such as telephone lines, packet switched networks, the Internet, mobile telecommunications networks and the like.

What is missing in each of the aforementioned systems and methods, however, is a location-based information communications system and method that provides information (i.e., using a "pull" technology) or delivers information (i.e., using a "push" technology) for a specific geographic point (versus a localized region), where the information to be provided or delivered is determined by applying a statistical method to the nearest available existing geographic location-based information for a particular location and adjusting the output to account for location-specific features such as geography (i.e., terrain), historical trends, and other factors. Previous systems and methods provide regional "local" information, based on the data location point closest to the user's location, rather than truly localized information (based on the actual location point indicated for the user). Accordingly, there exists the need for such a system and methods.

SUMMARY AND OBJECTS OF THE INVENTION

Accordingly, it is a principal object of the present invention to provide a system for communicating geographic location-based information to a client computer that is statistically developed from geographic location-based information specific to one or more locations in close proximity to the location of the client computer.

It is another object of the present invention to provide a method involving an algorithm for developing geographic location-based information based on geographic location-based information specific to one or more locations in close proximity to the location of a client computer computer.

It is still another object of the present invention to deliver the computed geographic location-based information to the client computer using either a push or pull method whereby the computed information is pushed to or pulled by the client computer without an explicit request or client computer action.

It is another object of the present invention to deliver or provide geographic location-based information, after an explicit request is made by the client computer, where the computed information is further refined manually or automatically based on location-specific parameters to improve the accuracy of the computed information.

It is still another object of the present invention to provide the computed and refined information in a binary and graphical form to the client computer after receiving an HTML request for such information over a communications network, where the request includes location information for the client computer.

It is another object of the present invention to automatically update and refine the computed information based on the current location of the client computer and deliver or provide the update in a timely manner to warn the client computer of hazards.

Briefly described, those and other objects and features of the present invention are accomplished, as embodied and fully described herein, by a computer-implemented method for communicating geographic location-based information to a client computer operating in a communications network including the steps of a) receiving, by way of a first communications network, at least one request from a client computer, wherein the at least one request includes information about the location of the client computer, at least one user preference, and at least one query; b) parsing the at least one request to identify the location of the client computer, the at least one user preference, and the at least one query; c) identifying a set of information records, from a database of information records, that are relevant to the location of the client computer; d) selecting at least some of the information records from the set of information records based on the at least one query; e) computing a result from the at least some of the information records; and f) responding to the request, by way of the first communications network or by way of a second communications network, by delivering the computed result to the client computer, wherein the database of information comprises one or more records of weather information, weather forecast information, news, sports, quotes, and advertisements, and wherein the database of information contains records stored in a format selected from digital audio, digital video, and text, and wherein the location of the client computer is determined using global positioning system data, wireless communications repeater towers, or both.

The objects and features of the present invention are also accomplished, as embodied and fully described herein, by a communications system having an information server; a geographic location-based database in data communication with the information server; a client profile database in data communication with the information server; and a communications network operatively connected to the information server for communicating one or more of the geographic location-based records from the geographic location-base database to a client computer.

With those and other objects, advantages, and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

FIG. 1b is another drawing of the point driven forecasting engine used to populate geographic-based data records as shown in FIG. 1a;

FIG. 2b is a continuation of the process flow diagram of FIG. 2a;

DETAILED DESCRIPTION OF THE PREFERRED EMBODIMENT

Figure 1A:
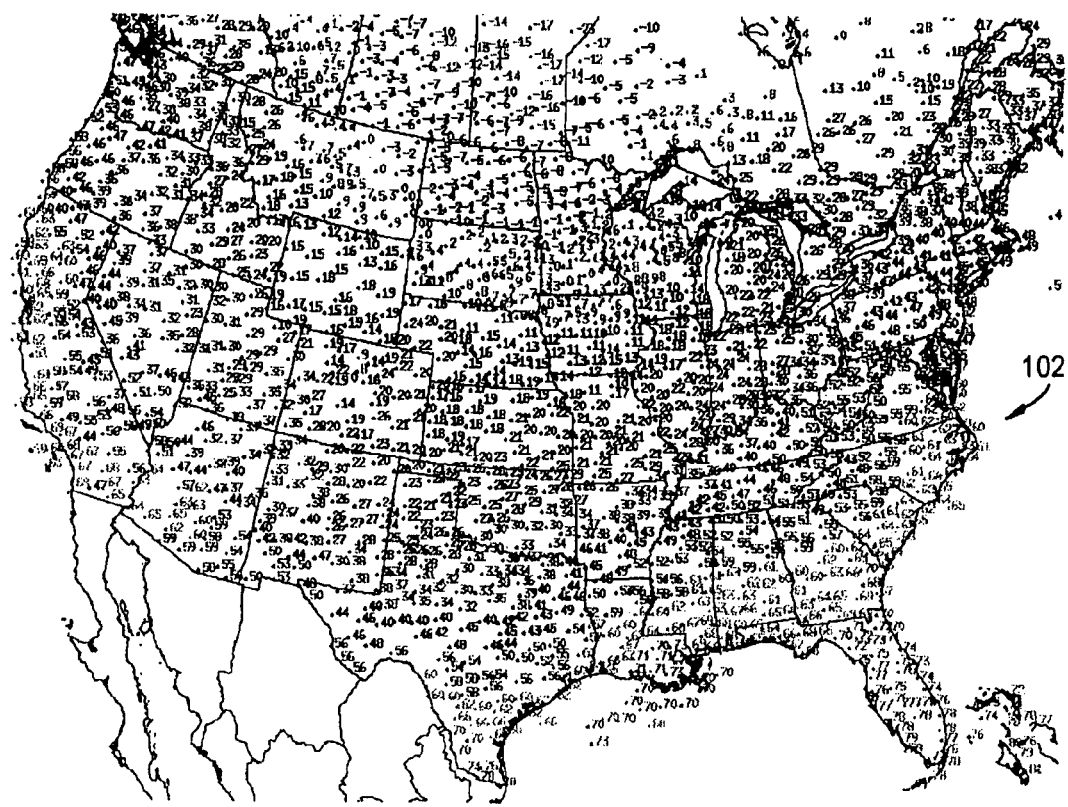
FIG. 1a is a drawing illustrating the point driven forecasting engine used to populate geographic-based data records according to one embodiment of the invention.

Several preferred embodiments of the invention are described for illustrative purposes, it being understood that the invention may be embodied in other forms not specifically shown in the drawings.

The present invention has several distinct and interrelated components, including a database of geographic location-based information records and a communications system for providing or delivering the information to a client computer (and, of course, the user of the client computer). The system and method are described in the context of geographic location-based natural phenomenological information (e.g., weather observations and forecast information). However, the system and method may encompass storing and providing or delivering other types of information that can be linked to a geographic location (e.g., sales of goods at a nearby retail store, starting times for movies at a nearby movie theater, and traffic alerts for predicted routes of travel). The system and method may also encompass storing and providing or delivering information that may be important to a client at a particular location but that may be location-independent (e.g., stock quotes and sports scores deliverable to a person waiting at an airport).

In the case of natural phenomenological information (which is inherently geographically location-based information), numerical weather prediction data from various outputs are obtained for inputting as records in the geographic location-based information database. Most of those outputs are available electronically from the U.S. National Weather Service, Environment Canada, the UK Meteorological Office, and other sources, as point data (i.e., point forecasts, which are relative to a precise location, such as an airport). Forecasts going out to 15 days or more in advance may be determined using that point source data, which may then be inputted as additional records in the geographic location-based information database.

FIG. 1a is a drawing illustrating the point-driven forecasting engine used to populate geographic-based data records according to one embodiment of the invention. Each point on FIG. 1a may represent the location of an airport or other location where point source data may be available.

In addition to point source data, models may be used to output additional data. Models are generally developed on an equally spaced grid of (x,y) locations; however, a grid is not necessary to define the outputs. Forecasters look at point data (i.e., location data, including location-specific features, elevation, etc.), and then alter the forecast data accordingly.

In addition to that type of model output, point specific information developed from large scale models may be used as geographic-based data records, with interpolation and statistical analysis techniques used for providing location-specific information records at many additional points. Those models, therefore, can produce a localized forecast product for any given location.

Figure 1B:
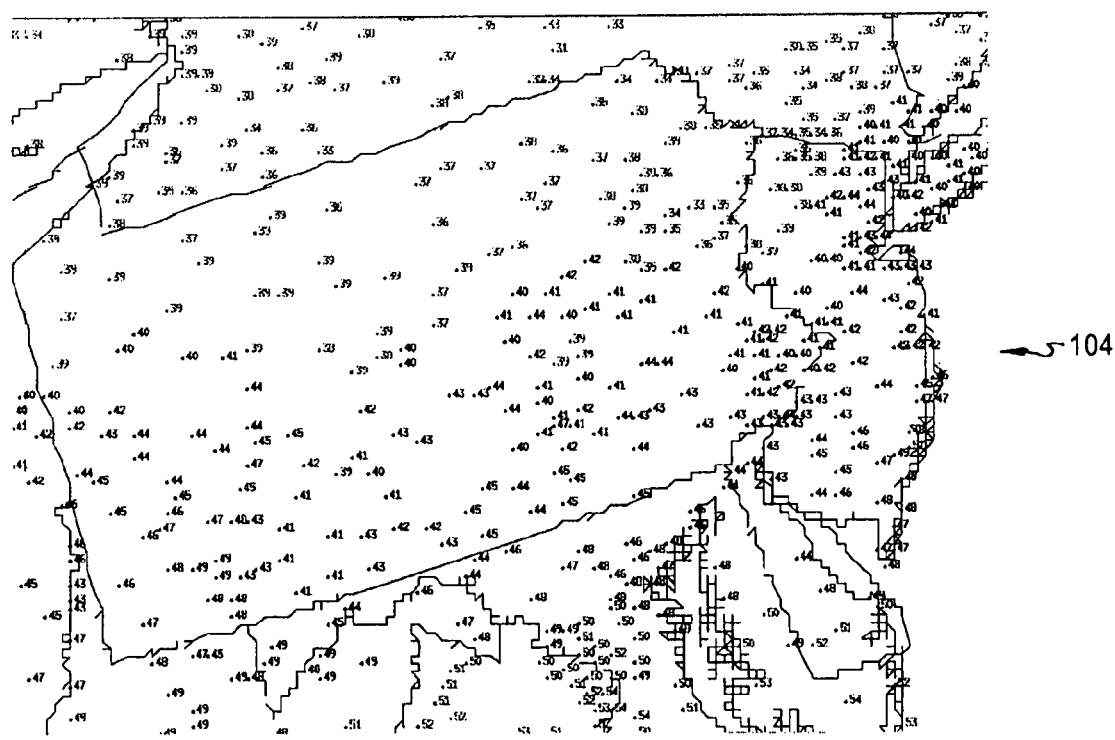

Radar and other data may also be used, which is not necessarily relevant to any particular grid system. All of the data points in FIG. 1a can be called up individually, in a group, or by a map region, as illustrated in FIG. 1b.

The geographic location-based information database then takes all of that data and uses a set of equations for each location within the database to interpolate the data. For example, for Reagan National Airport, the natural phenomenological weather data records are determined using an equation that simply assimilates the data available for the airport itself. That is, no interpolation is required. However, for a location like Westminster, Md., which may not have specific geographic-based information, a unique equation will determine how to use the data from other points, such as Reagan National Airport data, and possibly other surrounding locations, to come up with a geographic-based information (e.g., forecast information) for that location.

The denser the population, the more data points are available that can be used to determine current or forecasted conditions. The same equations for interpolating the weather-related information can be applied to other types of geographic location-based information.

Turning to the communications aspect of the invention, two applications reside on a client computer (which may be a mobile communications device, like a phone or personal data assistant). The first application provides a graphical user interface between the client and the geographic location-based information server. The other application is a location detection application (although one of ordinary skill will appreciate that a single application with features of both the first and second applications could also be used). On the server side, a client profile database resides on a client-profile server. Geographic location-based information records are stored in a database on one or more information servers. A communication server, which may be separate from the information server, provides data communication between a client's wireless service provider's server and the present system.

Figure 2A:
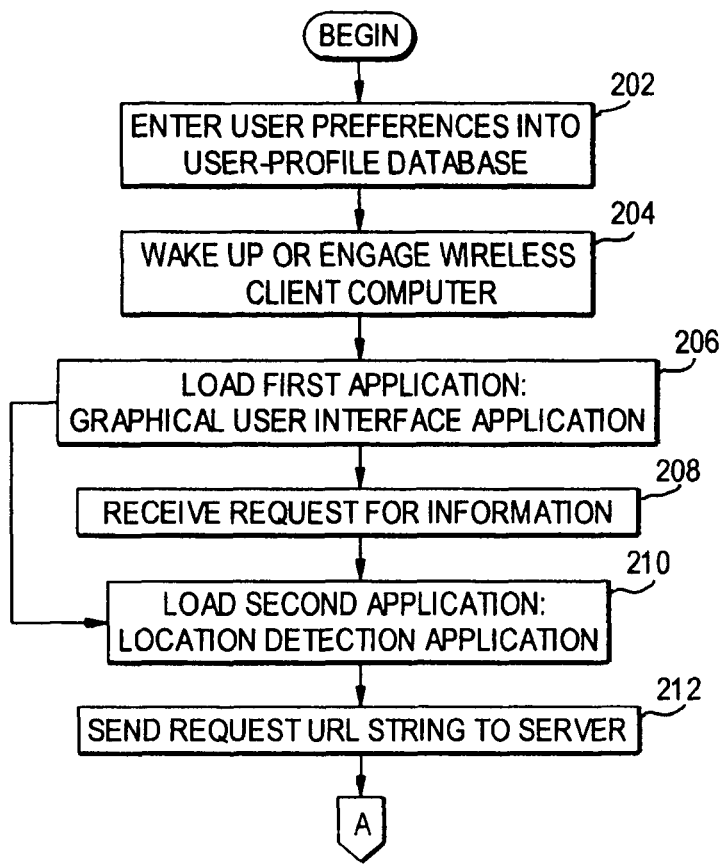
FIG. 2a is a process flow diagram according to the present invention.
Figure 2B:
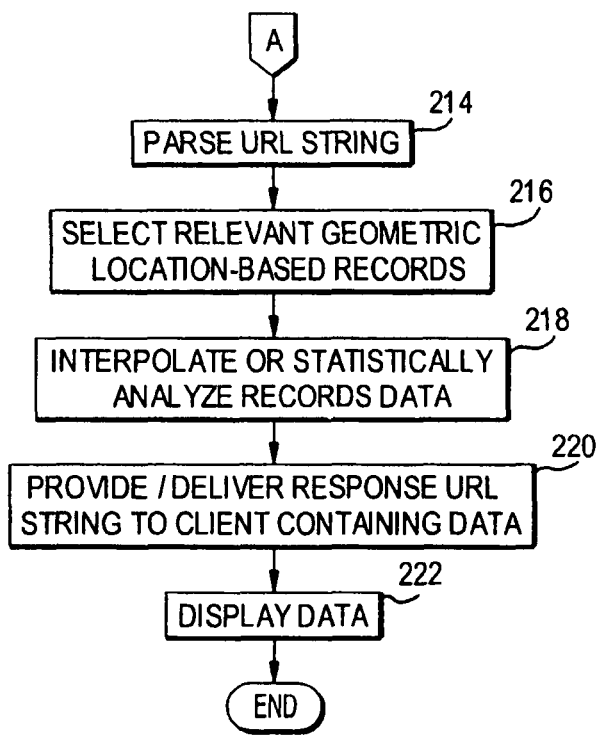

Referring now to FIGS. 2a and 2b, FIG. 2a shows the client-side operations while FIG. 2b shows the server-side operations. In step 202, a client or user enters client preferences into a client-profile database stored on the client-profile server. In the case of weather-related information, the client-profile database may contain such records as a unique client identifier, a client computer identifier, personal contact information, a wireless device access code, such as a phone number (which is linked to the client computer identifier), client name, password, push conditions (selectable from a menu of options defining when information will be pushed to the client computer), defined geographic or spatial locations of interest, billing information, and possibly other relevant information.

The client preferences may be set up so that geographic location-based information that is provided or delivered to the client computer may be different depending on the location of the client computer. For example, if a client is at his or her home, the system may send all requested information. Conversely, if the client is at his or her work place, the system may only send certain requested information.

Entering the client preferences in the client-profile database may be accomplished using the client computer or using some other Internet or network connection device (i.e., a separate client computer, such as a desktop computer at the client's residence or work place).

In step 204, the system wakes up or engages a wireless client computer, which, as noted above, could be a wireless telephone, PDA, personal computer, or the like). Step 204 is necessary where geographic location-based information is pushed to the client computer (i.e., where the client has opted to receive alerts of severe weather, stock information, or specific types of news at a pre-determined time). Wake up events involve delivering information to the client computer without the client computer, or the applications executing thereon, having to make a server call to retrieve the information. The application wakes up the client computer so that the information may be displayed to the client. That can be done without a server call because the client has already entered, during process step 202, client-profile information, including defined geographic or spatial locations of interest. However, additional geographic location-based information may be pushed to the client computer at the same time, or at a different time, after waking up the client computer, based on the content of the information and/or based on the then approximate location of the client computer as determined from the last known location of the client computer.

For example, if the client had requested receipt of severe weather alerts for a specified location, he or she would receive such information during a push event when the possibility of severe weather was predicted for that location. The client computer could then also download a graphic file related to the information from the information server. In addition, if the last known location of the client computer was determined to be the Pittsburgh airport, for example, additional geographic location-based information may also be pushed to the client computer at the same time, or after a pre-determined time period delay.

That last scenario may be accomplished if the client entered in his or her client profile a request for information for the last known location of the client computer. As an example, once a severe weather warning is issued, the information is delivered to the client computer as described above. However, the application executing on the client computer then asks the client if he or she wishes to view weather warnings and the latest radar image. The latest radar image would be pulled from the information server 412 (FIG. 4) based on the last known location of the client computer (alternatively, the second, GPS, application running on the client computer determines the exact location of the client computer and passes that information to the first application).

Step 204 is also necessary where geographic location-based information is to be pulled by the client, as when the client uses his or her computer.

In step 206, the client computer loads the first application, which typically includes a graphical user interface, for the client to use on the client computer. The application may reside in memory on the client computer, or it may be downloaded via a communications network from a remote server on a per use or per client basis. The application is then executed by the client computer. The first application may be provided as, for example, a BREW® (from Qualcomm) or J2ME™ (from Sun Microsystems) application.

In step 208, which defines an embodiment of the invention where information is to be pulled by the client (otherwise, step 208 is skipped), the client enters a request for geographic location-based information into the client computer using the first application.

In step 210, the client computer loads the second application (or a second object of the overall application), which is a location detection application, and obtains the location of the client computer within a grid system (i.e., an x,y coordinate system relative to the Earth's surface, such as latitude/longitude coordinates, Universal Transverse Mercator coordinates, etc.). The location may be determined using any available global navigation positioning system telemetry data, telecommunications transceiver relay tower signals, or a combination of the two. For example, GPS telemetry data may be used. Alternative sources of telemetry data are available from the Glonass system and, in the future, the European Galileo system. The second application may be pre-loaded onto the client computer by the manufacturer. Instead of using a location detection application, the client can simply enter a location in the form of a zip code or city or location name.

In step 212, the request is preferably formatted as a URL text string, which includes specific information about the client, the client computer, the requested information, and the location of the client computer, and is sent, following the Internet Protocol, to the geographic location-based information server 412 (FIG. 4) or a separate server in data communication with a wireless service provider. Alternatively, the request may be communicated using a different protocol, such as the .NET protocol, or using some other technology capable of communicating the information over a packet-switched or circuit-switched network (or a combination of the same).

For example, the basic query or request URL string may be in the form of:

http://www.accuweather.com|requestdata.html?myquery

Where information about the location of the client computer is added, the URL string may look like the following:

http://www.accuweather.com/requestdata.html?myquery&mylocationnow=381240455495

In the case of weather-related information, the requested information and URL string may include an image type (e.g., radar, satellite, etc.), dimensions of the image requested, zoom level, color table to be used to generate the image, and image format. Some of those parameters may be set by the client as a client preference and stored in the client-profile database.

In general terms, the URL string may look like the following:

http://www.accuweather.com/
requestdata.html?myquery&field1=value1&field2=value2& . . . &fieldn=valuen&mylocationnow=381240455495&mypreferences The above URL can be parsed by the information server 412 (FIG. 4) using a split function that separates each fieldn-valuen pair at the "&" symbol. If the string is encrypted, an encryption key will be needed to first convert the encrypted string into a format that the information server 412 can use.

Turning now to FIG. 2b, the server-side operations involve using a computer-readable storage medium storing instructions that when executed by a computer causes the computer to perform a method for communicating geographic location-based information to a client computer operating in a communications network. As shown in FIG. 2b, in step 214, the information server 412 receives the URL text string from the client and parses it, looking for the various parameters such as the location information assigned by the location detection application running on the client computer. In the above example URL string, the information server 412 would locate the "mylocationnow" string and assign the value 381240455455 to a variable. That variable can then be manipulated mathematically to compute a point location in terms of latitude (38.12.40) and longitude (45.54.55). The information server 412 retrieves client-profile information from the client-profile database server, as needed (to increment, for example, the client's monthly service charge for the requested information transaction).

In step 216, the appended location information is used to select appropriate or relevant geographic location-based records from the geographic location-based information server. The server includes a database of zip codes and city or location names and a lookup table that can be used to correlate those zip codes and city or location names to the computed (x,y) point location.

In step 218, the information server 412 statistically analyzes the geographic location-based records by taking the weighted average of three or more location points (if that many are available). In the case of weather information, the server applies the weather data that are in the database. That data may include, but is not limited to, real-time weather observations, satellite data, Doppler radar data, historical data for the region, and model data. All of the data are scrubbed for quality assurance purposes. Part of the quality assurance process and statistical analysis of the geographical location-based information records includes, where applicable, an adjustment that takes into account geographic factors (i.e., terrain, altitude, proximity to water bodies, etc.), historical trends in the information, and other factors. It will also include meteorological factors that will add additional correction schemes (i.e. an algorithm that will profile the atmosphere to give a better representation of how temperature changes with elevation), to ensure a localized and unique forecast.

Figure 3:
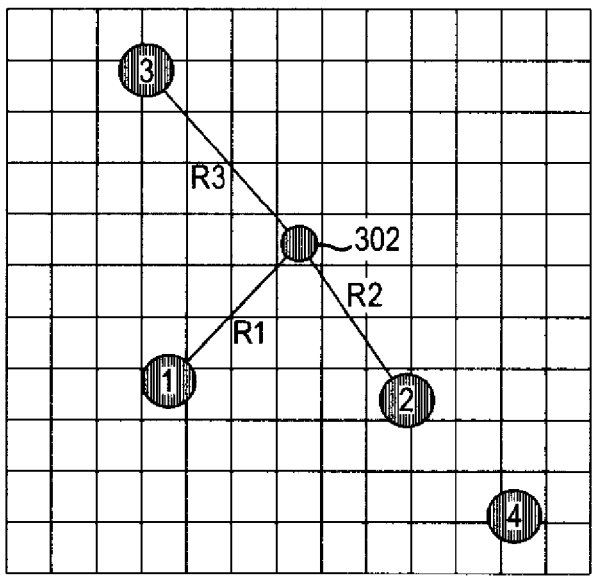
FIG. 3 is a schematic drawing of a point location of a client computer shown relative to existing geographic location-based information or data sources, stored in a database, according to the present invention.

To further elaborate on that process, shown in FIG. 3 is a schematic drawing of a point location of a client computer 302 shown relative to existing geographic location-based information sources (i.e., contained in the information database 414 (FIG. 4)). It illustrates one statistical analysis method of computing location-specific information for client computer 302. If the computed point location of the client computer 302 is identified relative to a grid system, the nearest three locations where geographic location-based information requested by the client can be checked for the requested information. Assume, for purposes of explanation, that each of the points R1, R2, and R3 includes the requested information. The personalized location-specific information value calculated for the location of the client computer at point 302, can be determined from a weighted average, W, of the data at each of the three nearest data points using the relative linear distances $R_1$, $R_2$ and $R_3$ as follows:

$$W_{302} = \frac{\sum_{i=1}^{3} ((1 - R_i/(R_1 + R_2 + R_3)) \times w_i)}{\sum_{i=1}^{3} (1 - R_i/(R_1 + R_2 + R_3))}$$

Thus, where the requested geographic location-based information is forecasted temperature and the forecasted temperatures for points 1, 2, and 3 (being 10, 15, and 20 miles, respectively, from point 302), are 68, 62, and 65 degrees Fahrenheit, then the computed value, $W_{302}$, of the forecasted temperature for the location of the client computer 302 is approximately 64.6 degrees Fahrenheit. Where natural phenomenological information has been requested, a simple altitude adjustment may need to be made where the client computer 302 is at an elevated location.

Of course, many other statistical analysis methods and adjustments are known in the art and may be implemented in the present invention. The statistical analysis may be performed before or after a weighted average is computed. Moreover, the final calculated value $W_{302}$ may be adjusted to account for location-specific features. For example, where the geographic location-based information is weather-related information, such as temperature in the example above, the final calculated value $W_{302}$ may be intelligently corrected to account for the microenvironment and microgeographic influences around the location, as well as to account for historical information. Thus, $W_{302}$=64.6 degrees F may be adjusted up to, for example, 66 degrees F, as follows:

$$W_{302} \pm MC_{302} = \text{Final } W_{302}$$

Where: MC stands for additional meteorological correction that can take into account, but is not limited to: temperature, humidity, wind speed and wind direction at various levels of the atmosphere from multiple atmospheric model inputs. That equation provides the unique correction and prediction for the user located point. For example, if the client computer 302 is located, for example, at an elevated position (i.e., at the top of a mountain) relative to the location-based information sources R1, R2, and R3, the computed value, $W_{302}$, may need to be adjusted to account for microgeographic and microenvironmental influences. For example, where location-based weather information is being requested by the client and the client computer 302 is located at the top of a mountain, and where R1 is located on the wetter, leeward side of the mountain and R2 and R3 are on the drier, windward side of the mountain, an appropriate adjustment should be made before providing or delivering the computer value, $W_{302}$.

Turning again to FIG. 2b, in step 220, the calculated or selected geographic location-based information is then automatically sent to the client computer. Under most instances, this will be a "pull" application (based on a client requesting the information). Alternatively, as noted previously, the system will use a "push" application in the case of, for example, severe weather alerts, where the communications system would "wake-up" the client computer (and its application(s)).

The alert function will only operate in the event the client has subscribed to an alerting service as designated in the client-profile database.

Alerting or forecasting on the fly can also be achieved in real-time or near real-time by the system as a client is moving from location to location. Alerting or forecasting can also be achieved based on a route provided by the client (i.e., via an electronic mail communications system, or sent via a wireless device, or otherwise inputted into the system by either the client directly, or from services such as AAA, MapQuest, MapBlast, Yahoo Maps, etc., that gives a detailed route and estimated time of travel, with an estimated start time, so that the system can then determine the optimal time to provide or deliver geographic location-based information to the client computer.

The information server 412 (FIG. 4) can also periodically request an update as to where any or all registered client computers are currently located (i.e., using the GPS application associated with the client computer) and store that location as a last known position for that client computer. That check could be done every second, every minute, every hour, etc., depending on the usage scenario (for weather-related information, the check would be in the one to ten minute range). If a severe weather warning for a specific area is then obtained or calculated by the geographic location-based server for delivery to the client computer, the system checks the database to see which client computers are currently within the warning area. A message is automatically delivered (pushed) to the client computer over the communication network.

Types of information pushed or pulled using the system include, but are not limited to, images, text strings, video, audio, and combinations (e.g., animations). For example, a digitally converted animation may be delivered as a "Weather Host" along with relevant location-specific forecasts via a mobile phone, where text files may be digitally converted to audio files and layered over the animation to create a virtual weatherperson. All images may be pre-generated and stored in the information server 412 (see FIG. 4) (so the client computer application does not have to post-process any image data). To further personalize the information, geographic-based images (i.e., maps) can be centered on the approximate location of the client computer. Other types of information that may be pushed or pulled using the system of the present invention include short message service (SMS) or multimedia message service (MMS) text and audio-visual messages. Tables, charts, graphs, and the like can also be provided or delivered to the client computer in various formats.

In step 222, the personalized geographic location-based information is then displayed or presented (in the case of audio only information) to the client using the client computer screen and/or audio speaker.

Figure 4:
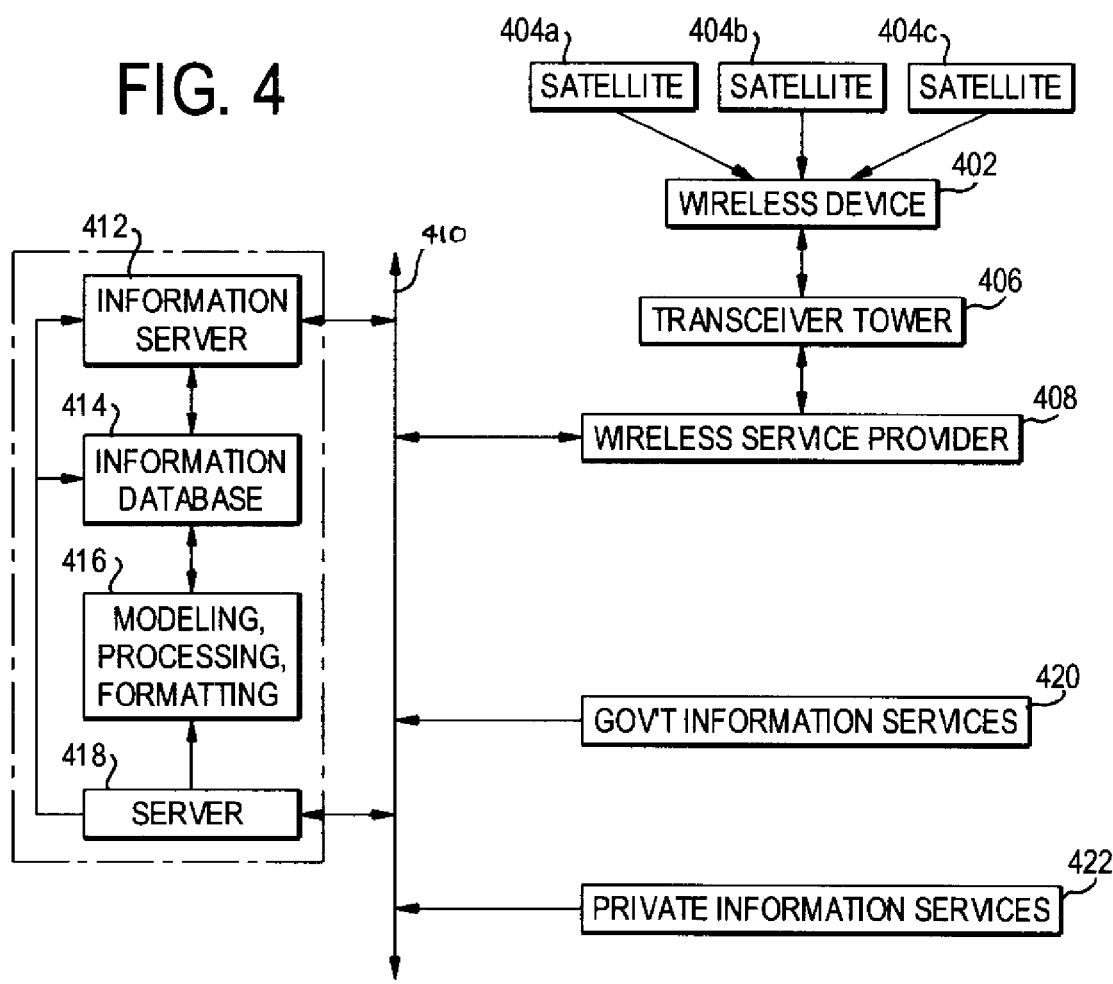
FIG. 4 is a block diagram of some of the hardware and architecture according to the present invention.

Turning now to FIG. 4, shown therein is a block diagram of the hardware and architecture according to one embodiment of the present invention. As noted above, the system of the invention involves a mobile device 402, such as a mobile phone, PDA, laptop computer, or other device (it could also be a wired device, such as a desktop computer). The device 402 is in data communication with and receives telemetry data from global navigation positioning system satellites 404a, 404b, and 404c (three satellites are shown and described for illustrative purposes only). Alternatively, location may be obtained using differential GPS (DGPS) or assisted-GPS (A-GPS) techniques, or it may be based on other satellite systems. Any automated technology that can determine location information for the device 402 is contemplated to be within the scope of the invention. The telemetry is used to identify a near real-time and accurate geographic location of the device 402. Thus, the device 402 may include an integral or external receiver and software for collecting and processing the telemetry data.

Alternatively, the location calculation can be done by the wireless service provider's communications network or even both depending on the solution deployed by the provider. A provider may employ both satellite-based and cell repeater tower data in order to obtain a more accurate location for the device 402.

In the case of a mobile device, the device 402 is in data communication with a wireless service provider 408 via one or more stationary transceivers 406, which are typically mounted on towers or building structures. The wireless service provider 408 is operatively connected to one or more communications networks 410, such as, but not limited to, the Internet.

In the case of a fixed device such as a desktop computer, the device 402 is in data communication with an Internet service provider (not shown) via a wired connection or via a wired and wireless combination connection.

Geographic location-based information may be transmitted to the wireless device 402 from an information server 412 which is also wirelessly, wired, or otherwise operatively connected to the network 410. The information server 412 is in data communication with an information database 414 and a data intake server 418. The data intake server 418 receives various types and formats of data from governmental information sources 420 and private information sources 422. Depending on the type of information received, the governmental and private information may be input into an information analyzer 416, which consists of models that transform the data into various outputs, processes the information so that it is more readily usable, and formats the information as necessary (other functions are also contemplated). The model outputs and the processed and formatted information are stored in the information database 414.

Additional embodiments of the present system and method are now described. In one such embodiment, the first application residing on the client computer does not send the location information obtained from the second application. Rather, a set of locations where geographic location-based information is available is delivered to the client computer based on the client computer's most likely current location. Then, when a client executes the first program on the client computer, the application creates a data packet containing the client's preferences and, instead of the location of the client computer, three codes corresponding to the three locations closest to the location of the client computer having available information that is being requested. The precise location of the client computer is essentially masked according to that embodiment of the invention.

In still another embodiment, the system automatically and continuously communicates geographical location-based information to the client computer that is relevant to a broad area likely to include the location of the client computer. The client would not need to send a request to the geographic location-based information server 412 in the form of a data packet containing the client's preferences and location information in order to receive requested geographic location-based information. Essentially, most of the functions of the system would be executed by the client computer without the need to query the information server 412 directly.

In another embodiment, the current location of the client computer is automatically and continuously communicated to the information server 412 at regular intervals of time.

When a client executes the first application on the client computer and sends a request for geographic location-based information, the data packet sent to the information server 412 by the client computer includes only client preferences and a query for information but it does not include location information. That would require storing location information in a database until the information server 412 receives the request and cross-references the location information to the request.

In still another embodiment, the system and method of the present invention allow a client to select multiple categories or genres of geographic and non-geographic-based information that is provided by downloading and executing a third application on the client computer, such as a plug-in.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

We claim:

1. A computer-implemented method for communicating geographic location-based information to a client computer operating in a communications network comprising the steps of:
   receiving, by way of a first communications network, at least one request from a client computer, wherein the at least one request includes information about the location of the client computer, at least one user preference, and at least one query;
   parsing the at least one request to identify the location of the client computer, the at least one user preference, and the at least one query;
   identifying a set of information records, from a database of information records, associated with a plurality of geographic locations based on the location of the client computer;
   selecting at least some of the information records for each of the plurality of geographic locations from the set of information records based on the at least one query;
   computing a weighted statistical value for the location of the client computer using a plurality of weights and each of the selected information records for each of the plurality of geographic locations, wherein the plurality of weights are calculated from relative linear distances between the location of the client computer and at least two of the plurality of geographic locations, and wherein the weighted statistical value is a weighted statistical average of the selected information records for said at least two of the plurality of geographic locations, weighted in accordance with the weights, and wherein the weighted statistical value takes into account at least one of geographic factors or historical trends;
   adjusting the computed value to account for at least one specific geographic characteristic of the location of the client computer and the geographical location associated with the selected information records; and
   responding to the request, by way of the first or second communications network, by delivering or providing the adjusted value to the client computer.

2. The computer-implemented method of claim 1, wherein the database of information comprises one or more records of weather information, weather forecast information, news, sports, quotes, and advertisements.

3. The computer-implemented method of claim 1, wherein the database of information contains records stored in a format selected from audio, video, and text.

4. The computer-implemented method of claim 1, wherein the location of the client computer is determined using global navigation positioning system telemetry data, wireless communications repeater towers, or both.

5. The computer-implemented method of claim 1, wherein the computed value is in the form of binary and graphical information and wherein the request is in the form of one or more Internet Protocol data packets.

6. The computer-implemented method of claim 1, wherein the first communications network is a packet-switched network such as the Internet.

7. A computer-implemented method for communicating geographic location-based information to a client computer operating in a communications network comprising the steps of:
   providing a client profile database including at least one record of a client location of interest, a client computer identifier, and at least one alert condition;
   receiving, in a geographic location-based information database, geographic location-based information covering a geographic area, the area including a plurality of geographical locations, at least some of the geographic location-based information determined using a weighted statistical value for at least some of the plurality of geographical locations, the weighted statistical value being computed using a plurality of weights and the geographic location-based information, wherein the plurality of weights are calculated from relative linear distances between a location of the client computer and at least two of the plurality of geographical locations, and wherein the weighted statistical value is a weighted statistical average of the selected information records for said at least two of the plurality of geographic locations, weighted in accordance with the weights, and wherein the weighted statistical value takes into account at least one of geographic factors or historical trends;
   parsing the client profile database to identify the client location of interest and the at least one alert condition;
   identifying a set of information records, from a database of information records, associated with a plurality of geographic locations based on the client location of interest;
   computing a change in the geographic location-based information covering the geographic area;
   determining whether the change satisfies the at least one alert condition;
   determining whether the covered geographic area includes the client location of interest;
   formulating a data packet containing information based on at least some of the geographic location-based information for each of the plurality of geographic locations relevant to the computed change, wherein the at least some of the geographic location-based information is adjusted to account for at least one specific geographic characteristic of the client location of interest and the geographical location associated with the geographic location-based information; and
   sending the data packet to the client computer associated with the client computer identifier.

8. The computer-implemented method of claim 7, wherein the geographic location-based information comprises weather information and weather forecast information.

9. The computer-implemented method of claim 7, wherein the at least one alert condition is one of a wind speed, temperature, visibility, precipitation amount, precipitation accumulation, and precipitation effect, or a combination of two or more of those alert conditions.

10. A system for providing geographic location-based information to a client computer operating in a communications network comprising:
- a geographic location-based records database in data communication with an information server;
- a client profile database in data communication with the information server, wherein the client profile database contains at least one user preference;
- a receiving device for receiving at least one request from a client computer, wherein the at least one request includes information about a location of the client computer;
- a parsing subsystem for extracting from the request the location of the client computer;
- an identifying subsystem for selecting a set of information records from the database of information records associated with a plurality of geographic locations and that are relevant to the at least one user preference and the location of the client computer;
- a computing device for computing a weighted statistical value for the location of the client computer using a plurality of weights and the selected information records for each of the plurality of geographic locations, wherein the plurality of weights are calculated from relative linear distances between the location of the client computer and at least two of the plurality of geographic locations, and wherein the weighted statistical value is a weighted statistical average of the selected information records for said at least two of the plurality of geographic locations, weighted in accordance with the weights, and wherein the weighted statistical value takes into account at least one of geographic factors or historical trends, wherein the computed value is adjusted to account for at least one specific geographic characteristic of the location of the client computer and the geographical location associated with the selected information records; and
- a communications network for communicating one or more geographic location-based records from the geographic location-based records database and the adjusted value to a client computer.

11. The system of claim 10, wherein the geographic location-based records database comprises one or more records of weather information, weather forecast information, news, sports, quotes, and advertisements.

12. The system of claim 10, wherein the geographic location-based records database contains records stored in a format selected from audio, video, and text.

13. The system of claim 10, wherein the location of the client computer is determined using global navigation positioning system telemetry data, wireless communications repeater towers, or both.

14. The system of claim 10, wherein the computed value is in the form of binary and graphical information.

15. The system of claim 10, wherein the communications network is a packet-switched network such as the Internet.

16. A computer-readable storage medium storing instructions that when executed by a computer causes the computer to perform a method for communicating geographic location-based information to a client computer operating in a communications network, the method comprising the steps of:
- receiving, by way of a first communications network, at least one request from a client computer, wherein the at least one request includes information about the location of the client computer, at least one user preference, and at least one query;
- parsing the at least one request to identify the location of the client computer, the at least one user preference, and the at least one query;
- identifying a set of information records, from a database of information records, associated with a plurality of geographic locations based on the location of the client computer;
- selecting at least some of the information records for each of the plurality of geographic locations from the set of information records based on the at least one query;
- computing a weighted statistical value for the location of the client computer using a plurality of weights and each of the selected information records for each of the plurality of geographic locations, wherein the plurality of weights are calculated from relative linear distances between the location of the client computer and at least two of the plurality of geographic locations, and wherein the weighted statistical value is a weighted statistical average of the selected information records for said at least two of the plurality geographic locations, weighted in accordance with the weights, and wherein the weighted statistical value takes into account at least one of geographic factors or historical trends;
- adjusting the computed value to account for at least one specific geographic characteristic of the location of the client computer and the geographical location associated with the selected information records; and
- responding to the request, by way of the first communications network or by way of a second communications network, by delivering or providing the adjusted value to the client computer.

17. The computer-implemented method of claim 16, wherein the database of information comprises one or more records of weather information, weather forecast information, news, sports, quotes, and advertisements.

18. The computer-implemented method of claim 16, wherein the first communications network is a packet-switched network such as the Internet.

19. A computer-implemented method for communicating geographic location-based information to a client computer operating in a communications network comprising the steps of:
- outputting, by way of a first communications network, to a client computer a set of geographic locations corresponding to respective locations where geographic location-based information is available;
- receiving at least one request from the client computer, wherein the at least one request includes information identifying from the set of geographic locations a plurality of geographic locations closest to the geographic location of the client computer, at least one user preference, and at least one query, wherein said request does not include an actual location of the client computer;
- parsing the at least one request to identify the geographic locations from the set of geographic locations closest to the client computer, the at least one user preference, and the at least one query;
- identifying a set of information records, from a database of information records, associated with the set of geographic locations closest to the client computer;
- selecting at least some of the information records based on the at least one request;
- computing a weighted statistical value using a plurality of weights and each of the selected information records, wherein the plurality of weights are calculated from relative linear distances between the location of the client computer and at least two of the plurality of geographic locations, and wherein the weighted statistical value is a weighted statistical average of the selected information records for said at least two of the plurality of geographic locations, weighted in accordance with the weights, and wherein the weighted statistical value takes into account at least one of geographic factors or historical trends; and responding to the request, by way of the first or a second communications network, by delivering or providing the computed value to the client computer.

20. A computer-implemented method for communicating geographic location-based information to a client computer operating in a communications network comprising the steps of:

receiving, by way of a first communications network, location information about the geographic location of a client computer;

parsing the location information to identify the geographic location of the client computer;

identifying a set of information records, from a database of information records, associated with a plurality of geographic locations based on the location of the client computer;

selecting at least some of the information records for each of the plurality of geographic locations from the set of information records based on the location of the client computer;

outputting to the client computer the selected information records;

computing, on the client computer, a weighted statistical value for the location of the client computer using a plurality of weights and each of the selected information records for each of the plurality of geographic locations, wherein the plurality of weights are calculated from relative linear distances between the location of the client computer and at least two of the plurality of geographic locations, and wherein the weighted statistical value is a weighted statistical average of the selected information records for said at least two of the plurality of geographic locations, weighted in accordance with the weights, and wherein the weighted statistical value takes into account at least one of geographic factors or historical trends;

automatically adjusting the computed value to account for at least one specific geographic characteristic of the location of the client computer and the geographical location associated with the selected information records; and outputting on the client computer the adjusted value.

21. A computer-implemented method for communicating geographic location-based information to a client computer operating in a communications network comprising the steps of:

automatically and continuously storing on a server updated location information concerning a geographic location of at least one client computer;

receiving at the server at least one request from the at least one client computer, wherein the at least one request includes at least one user preference and at least one query;

parsing the at least one request to identify the at least one user preference and the at least one query;

identifying a set of information records, from a database of information records, associated with a plurality of geographic locations based on the most updated location information concerning the location of the client computer;

selecting at least some of the information records for each of the plurality of geographic locations from the set of information records based on the at least one query;

computing a weighted statistical value for the location of the client computer using a plurality of weights and each of the selected information records for each of the plurality of geographic locations, wherein the plurality of weights are calculated from relative linear distances between the location of the client computer and at least two of the plurality of geographic locations, and wherein the weighted statistical value is a weighted statistical average of the selected information records for said at least two of the plurality of geographic locations, weighted in accordance with the weights, and wherein the weighted statistical value takes into account at least one of geographic factors or historical trends;

adjusting the computed value to account for at least one specific geographic characteristic of the location of the client computer and the geographical location associated with the selected information records; and responding to the request, by way of the first or second communications network, by delivering or providing the adjusted value to the client computer.

22. A computer-implemented method for communicating geographic location-based information to a client computer operating in a communications network comprising the steps of:

automatically and continuously storing on a server updated location information concerning a geographic location of at least one client computer;

executing on the client computer an application program adapted to allowing a user to pre-select at least one category or genre of geographic location-based and non-geographic location-based information of interest;

receiving at least one request from the application program, wherein the at least one request includes at least one user preference and at least one query;

parsing the at least one request to identify the at least one user preference and the at least one query;

identifying a set of information records, from a database of information records, associated with a plurality of geographic locations based on the most updated location information concerning the location of the client computer, wherein the set of information records corresponds to the pre-selected at least one category or genre of geographic location-based and non-geographic location-based information of interest;

selecting at least some of the information records for each of the plurality of geographic locations from the set of information records based on the at least one query;

computing a weighted statistical value for the location of the at least one client computer using a plurality of weights and each of the selected information records for each of the plurality of geographic locations, wherein the plurality of weights are calculated from relative linear distances between the location of the client computer and at least two of the plurality of geographic locations, and wherein the weighted statistical value is a weighted statistical average of the selected information records for said at least two of the plurality of geographic locations, weighted in accordance with the weights, and wherein the weighted statistical value takes into account at least one of geographic factors or historical trends;

adjusting the computed value to account for at least one specific geographic characteristic of the location of the at least one client computer and the geographical location associated with the selected information records; and responding to the request by delivering or providing the adjusted value to the at least one client computer.

23. The computer-implemented method of claim 1, wherein the plurality of weights are calculated from relative linear distances between the location of the client computer and at least three of the plurality of geographic locations, and wherein the weighted statistical value is a weighted statistical average of the selected information records for said at least three of the plurality of geographic locations, weighted in accordance with the weights.

\* \* \* \* \*